Sept. 11, 1962 R. B. GRAY 3,053,934

AMPLIFIER SYSTEM FOR STEREO SOUND

Filed April 21, 1959 2 Sheets-Sheet 1

INVENTOR.
Robert B Gray
BY Ralph Hammar
Attorney

INVENTOR.
Robert B Gray
BY Ralph Hammar
Attorney

United States Patent Office 3,053,934
Patented Sept. 11, 1962

3,053,934

AMPLIFIER SYSTEM FOR STEREO SOUND

Robert B. Gray, Erie, Pa., assignor to Erie Resistor Corporation, Erie, Pa., a corporation of Pennsylvania Filed Apr. 21, 1959, Ser. No. 807,906
5 Claims. (Cl. 179—1)

This invention is an amplifier system for stereo sound which provides balanced volume and tone control for each channel and which decreases the cross talk between the channels.

Figures 1, 2:
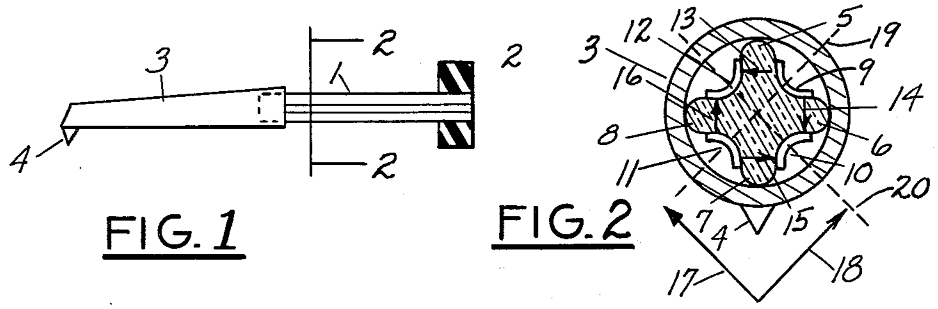
Figure 3:
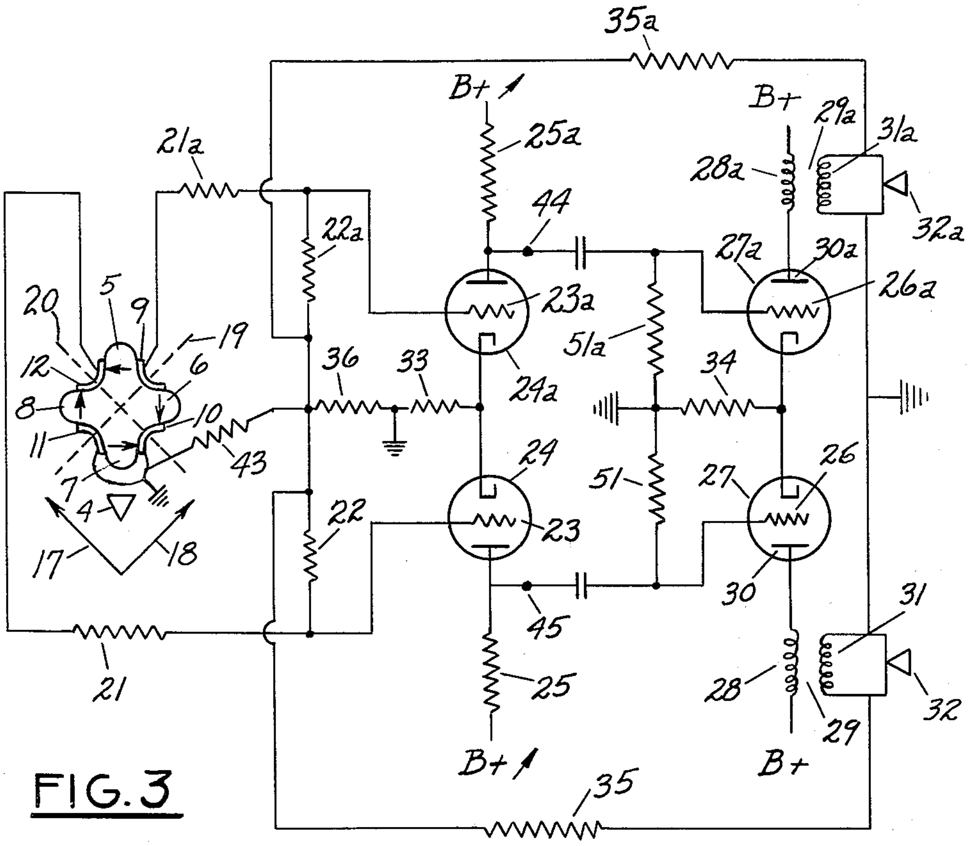
Figure 4:
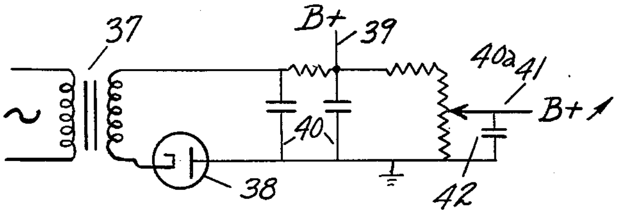
Figure 6:
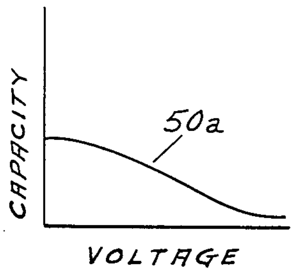
Figure 5:
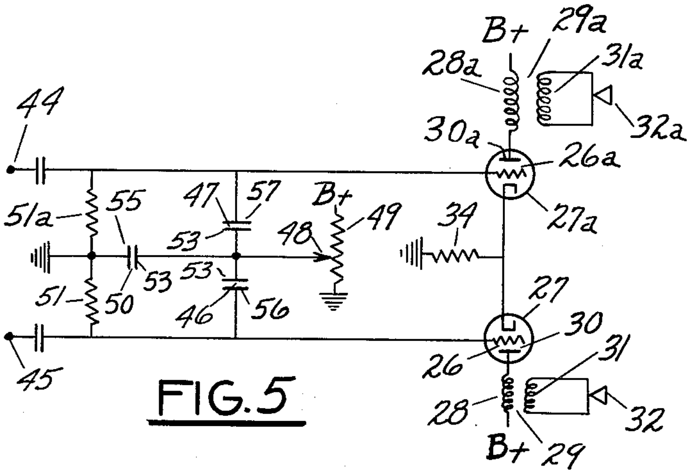
Figures 7, 8:
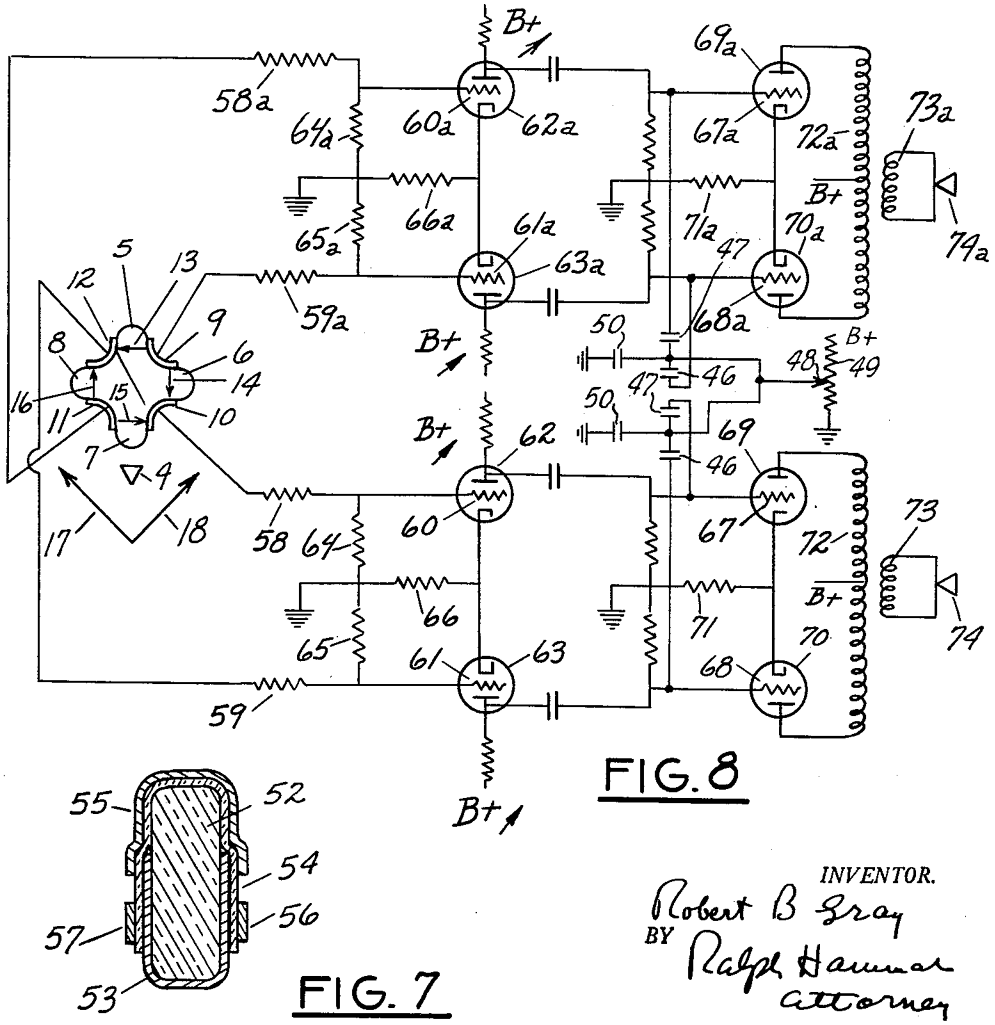

In the drawings, FIG. 1 is a fragmentary side elevation of a stereo phonograph pickup, FIG. 2 is a section on line 2—2 of FIG. 1, FIG. 3 is a circuit diagram of a stereo amplifier system, FIG. 4 is a circuit diagram of the power supply for the amplifier system, FIG. 5 is a circuit diagram of a ferroelectric tone control, FIG. 6 is a diagram of the variation in capacitance of ferroelectric condensers with voltage, FIG. 7 is a section through a ferroelectric tone control capacitor, and FIG. 8 is a circuit diagram for a push-pull amplifier system.

The invention is shown applied to a stereo phonograph pickup having a polarized barium titanate ceramic element 1 supported at one end in a rubber bushing 2 and having its other end fixed in a chuck 3 for a needle or stylus 4. As described in greater detail in my application Serial No. 516,638, the ceramic is of X-shaped cross section with four substantially symmetrically disposed radially projecting flanges 5, 6, 7, 8 with an electrode 9 between flanges 5 and 6, an electrode 10 between flanges 6 and 7, an electrode 11 between flanges 7 and 8 and an electrode 12 between flanges 8 and 5. The ceramic is polarized in the direction of arrow 13 from electrode 9 to electrode 12, in the direction of arrow 14 from electrode 9 to electrode 10, in the direction of arrow 15 from electrode 11 to electrode 10, and in the direction of arrow 16 from electrode 11 to electrode 12. The pickup is intended for use in a single groove stereo record where one channel moves the needle 4 in the direction of arrow 17 at an angle of 45 degrees to the record surface and the other channel moves the needle in the direction of arrow 18 at right angles to the arrow 17 and also at 45 degrees to the record surface. The excursion of the needle 4 in the direction of arrow 17 causes bending of the ceramic element 1 about the axis 19 while the excursion of the needle in the direction of arrow 18 causes bending of element 1 about the axis 20. The output caused by excursions of the needle in the direction of arrow 17 appears between electrodes 10 and 12 and the output caused by excursions of the needle in the direction of arrow 18 appears across electrodes 9 and 11.

When the electrodes 10 and 11 are grounded as shown in FIG. 3, there is an electrostatic coupling which results in interchannel cross talk. For this particular connection, the cross talk will be 6 db less than the main channel output. That is, the output in the right channel will cause a similar output, but of 6 db less magnitude in the left channel and vice versa. There are other sources of cross talk in stereo phonograph pickups. In the single element type of pickup such as illustrated, misorientation of the element with respect to the needle 4 could cause cross talk. Nonuniformity of the ceramic is another source of cross talk. In other forms of stereo pickups using a separate element for each channel, cross talk may originate in the mechanical coupling from the needle to the elements. It can be assumed that in any stereo system there will be some cross talk between channels, although the sources of the cross talk may not be the same.

The amplifier system of FIG. 3 is intended to preferentially amplify the main channel output and to suppress or amplify to a lesser extent the cross talk.

The left channel output appearing between electrode 12 and grounded electrode 10 is coupled through resistors 21 and 22 to the grid 23 of a tube 24. The output appearing across plate resistor 25 is coupled to the grid 26 of a tube 27. The primary 28 of a transformer 29 is connected to the plate 30 of the tube 27. The secondary 31 of the transformer feeds the left speaker 32.

The output of the right channel which appears between electrode 9 and grounded electrode 11 is coupled through resistors 21*a* and 22*a* to the grid 23*a* of a tube 24*a*. The output which appears in plate resistor 25*a* is coupled to the grid 26*a* of a tube 27*a*. The primary 28*a* of a transformer 29*a* is connected to the plate 30*a* of the tube 27*a*. The secondary 31*a* of the transformer 29*a* feeds the right speaker 32*a*.

It will be noted that the left and right channels have separate amplifiers of identical construction. While each of these amplifiers has the same amplification of the main output appearing in its channel, it has a lesser amplification of cross talk. The amplifiers accordingly reduce the cross talk appearing in the speakers 32, 32*a* for reconstituting the stereo sound. Stated from another aspect, the amplifiers when fed by a pickup having a cross talk level of 6 db can reduce the cross talk level to the order of 20 db which is adequate channel separation for stereo sound systems.

The manner in which the cross talk is reduced will be considered first for the case in which the entire needle excursion is in the direction of arrow 17 with no excursion at all in the direction of arrow 18. The record groove accordingly has only a left channel output for speaker 32 and no output at all in the right channel for speaker 32*a*. Under this condition, however, there will be by reason of electrostatic coupling, a cross talk appearing on electrode 9 and fed through the amplifier system for the right channel. This cross talk will be substantially 6 db less than the output for the left channel appearing on electrode 12. Because the tubes 24 and 24*a* have a common cathode resistor 33, both of the grids 23 and 23*a* will have their signal reduced by the drop in the cathode resistor 33 which will be due to the sum of the left channel current due to the left channel output from electrode 12 and the right channel current due to the cross talk output from electrode 9. Since the cross talk at electrode 9 is smaller than the left channel output at electrode 12, the effect of the voltage drop through cathode resistor 33 will be greater on the cross talk than on the main left channel output. That is, the percentage reduction of cross talk amplification will be greater than for main channel output. This effect is further continued by the common cathode resistor 34 of the tubes 27, 27*a*. The numerical voltage drop through the cathode resistor 34 is a bigger percentage of the signal of grid 26*a* than of grid 26 with a result that the main channel output is amplified to a greater extent than the cross talk. Although the input to the amplifier system had a cross talk of substantially 6 db, the output appearing in speakers 32, 32*a* will have a cross talk of the order of 20 db less than the main channel output. A similar analysis could be made for the case where the entire needle excursion is in the direction of arrow 18 where the conditions would be reversed in that the main output would appear in the right channel feeding speaker 32*a* while the cross talk would appear in the left channel feeding speaker 32.

Another cross talk reducing feed back is provided by resistors 35, 35*a* forming part of voltage dividers having a common resistor 36. When the excursion of the needle 4 corresponds entirely to an output in the left channel indicated by arrow 17, the common resistor 36 carries a negative current proportional to the sum of the left channel output voltage in speaker 32 and the cross talk voltage in speaker 32*a* which decreases the grid signal in both tubes 23 and 23*a*.

The cross talk voltage, being the smaller, is degenerated to a greater extent than the main channel voltage, thereby having the same kind of effect as the common cathode resistors 33, 34.

If the voltage feed back is not desired, the lines containing the resistors 35 and 35*a* are omitted, the resistor 36 is omitted, and the resistors 22 and 22*a* are connected directly to ground.

It is desirable that the volume control for the channels match over the entire range to prevent distortion. When this is attempted by dual potentiometers, the potentiometers invariably fail to match over some part of the range. With concentric potentiometers, the user must adjust each channel individually to compensate for mismatch. In the present amplifier, the volume is controlled by varying the plate supply for the first stage tubes 24, 24*a* of the amplifiers. This inherently produces perfect match throughout the entire range.

The plate power supply shown in FIG. 4 is obtained from a transformer 37 with its secondary connected to a rectifier 38. The plate supply for the second stage of the amplifier is taken from line 39 at the end of a filter 40. The plate supply for the first stage of the amplifier is taken from a potentiometer 40*a* through an output line 41 shunted by a condenser 42. The voltage at line 41 can be varied from zero to maximum thereby producing the full range of volume control. To prevent grid current rectification at the lower range of volume, the resistors 21, 21*a* should be large enough to limit the grid current and to prevent charging of the capacitance of the pickup element 1 to the positive peaks of the signals. In a typical amplifier, the resistors 21 and 21*a* might be one megohm and the resistors 22 and 22*a* might be two megohms. The resistors 21 and 21*a* isolate the grids 23 and 23*a* from the capacitance of the pickup element 1. The size of the resistors is not critical. The resistors 21 and 21*a* are important at low volume and need not be used if the amplifier is always used at high volume. There is a resistor 43 in the ground return from electrodes 10 and 11 which may be omitted if the feed back resistor 33 has high enough value.

FIG. 5 shows a tone control applied to the second stage of the FIG. 3 amplifier. Terminals 44, 45 are to be connected at points 44, 45 in the FIG. 3 circuit. Except for the tone control, the circuit is identical with FIG. 3 and corresponding parts are marked with the same reference numerals. The tone control comprises ferro-electric condensers 46 and 47 respectively connected between grids 26 and 26*a* and a tap 48 on a potentiometer 49 and a ferro-electric condenser 50 connected between the tap 48 and ground. The ferro-electric condensers 47 and 48 are of the same capacity and all of the ferro-electric condensers have the property of substantially linear reduction in capacitance with increasing voltage as shown by curve 51 in FIG. 6. Ferro-electric materials exhibiting these properties are well known and may, for example, be barium titanate mixed with other ingredients depressing the Curie point or major transformation temperature to the vicinity of room temperature. The ferro-electric condensers 46, 47 and 50 are connected across resistors 51, 51*a* and attenuate the voltage on grids 26 and 26*a* to a greater extent as the signal frequency increases thereby producing the variation in amplification required for tone control.

A convenient structure for the ferro-electric tone control condenser is shown in FIG. 7 where a green ceramic body 52 has applied thereto a palladium or platinum metallic paint coating 53 which is to provide the corresponding numbered electrodes of the ferro-electric condensers 47, 48 and 50. A coating 54 of a slip of ferro-electric ceramic is applied over the body 52 and part of the palladium coating 53 and the coated ceramic body is then fired to mature the green ceramic body 52 and its coatings. Metal coatings 55, 56 and 57 are then applied over the coating 54 in overlapping relation to the metal coating 53 to provide the correspondingly numbered electrodes of condensers 50, 46 and 47. The resulting construction is a single unit comprising the three ferro-electric condensers 46, 47 and 50 ready for connection into the FIG. 5 circuit. The ferro-electric condensers 46 and 47 match each other closely so that as the tap 48 on the potentiometer is moved, the same variation of attenuation with signal frequency appears in both channels of the amplifier as is desirable for tone control.

In FIG. 8, the balanced volume control is shown applied to a push-pull stereo amplifier system. In this system, the output electrodes 10 and 12 for the left channel are connected through isolating resistors 58, 59 to grids 60, 61 of push-pull connected tubes 62, 63. The grids 60, 61 are connected to ground through resistors 64, 65 and the cathodes of the tubes 62, 63 are connected to ground through a common cathode resistor 66. The plates of the tubes 62, 63 are connected to the variable voltage plate supply 41 of the power supply of FIG. 4 and the volume is varied by varying the plate voltage. In the push-pull circuit, the isolating resistors 58, 59 have the same function as the resistor 21 and the grid resistors 64, 65 have the same function as the resistor 22 in FIG. 3, namely, preventing grid current rectification at low volume. The common cathode resistor 66 has the same function as the common cathode resistor 33 in discriminating against cross talk by preferentially amplifying the main channel signal and suppressing the cross talk signal. If this function is not wanted, the cathode resistor is shunted by a condenser. The outputs of the push-pull connected tubes 62, 63 are fed to grids 67, 68 of push-pull connected tubes 69, 70. The cathodes of the tubes 69, 70 are connected to ground through a common cathode resistor 71 which has the same cross talk suppressing function as the cathode resistor 34 in FIG. 3. The output of the tubes 69, 70 is connected across the primary 72 of a transformer whose secondary 73 is connected to the left channel speaker 74.

The right channel output appearing across electrodes 9 and 11 is connected to an identical push-pull amplifier where the corresponding parts are designated by the same reference numerals with the subscript *a*. Because the volume for each channel is controlled from a variable plate supply voltage, the channels are inherently matched throughout the entire volume range.

In the tone control, each amplifier has a resistor condenser network in which at least one condenser has a capacity which varies with voltage so that the frequency response of the network can be altered by varying the applied voltage. This inherently balances the tone control in both channels. For the push-pull amplifiers of FIG. 8 where the input to each stage is double ended, both ends should have a resistor condenser tone control network. This could be done by connecting one of the FIG. 7 condensers across the grids 67, 68 and another of the FIG. 7 condensers across the grids 67*a*, 68*a* with ground from tap 48 in the same manner as in FIG. 5. That would provide inherently balanced tone control for both condensers supplied by the variable voltage to stereo push-pull amplifiers.

What is claimed as new is:

1. An amplifier system comprising two amplifiers respectively having an input connected to one and the other channel of a stereo sound system and an output connected to a speaker for reproducing the sound of its channel, the amplifier inputs each having a circuit to ground including a common cathode resistor for cross coupling from one amplifier to the other.

2. An amplifier system comprising two amplifiers respectively having an input connected to one and the other channel of a stereo sound system and an output connected to a speaker for reproducing the sound of its channel, a voltage divider connected across the output of one of said amplifiers, another voltage divider connected across the output of the other of said amplifiers, said voltage dividers having a common resistor connected to both amplifier inputs for coupling a voltage proportional to the sum of the amplifier outputs back to the amplifier inputs.

3. An amplifier system comprising two amplifiers respectively having an input connected to one and the other channel of a stereo sound system and an output connected to a speaker for reproducing the sound of its channel, means for feeding back to both amplifier inputs a negative signal proportional to the sum of the amplifier outputs.

4. A stereo amplifier system comprising two vacuum tube amplifiers respectively having an input stage connected to one and the other channel of a stereo sound system and an output connected to a speaker for reproducing the sound of its channel, a common plate supply for the input stages of the amplifiers including means for varying the voltage of the plate supply to control simultaneously the volume of both input stages in equal proportions and said amplifiers each having an output stage with a fixed plate supply and means feeding back to both amplifiers input stages a negative signal proportional to the sum of the outputs of both amplifiers.

5. A stereo amplifier system comprising two amplifiers respectively for one and the other of the two channels of a stereo sound system, each amplifier having a signal input, a resistor connected from each input to ground, a potentiometer having a tap settable to a variable voltage, a ferroelectric condenser connected between said tap and ground, a pair of ferroelectric condensers respectively connected between said tap and one and the other of the two amplifier inputs, said capacitors having capacity varying with voltage and cooperating with said resistors to provide a tone control.

References Cited in the file of this patent

UNITED STATES PATENTS

| | | |
|---|---|---|
| 1,890,750 | Razek et al. | Dec. 13, 1932 |
| 1,893,044 | Walsh | Jan. 3, 1933 |
| 1,894,578 | Avery | Jan. 17, 1933 |
| 2,078,762 | Holst | Apr. 27, 1937 |
| 2,243,921 | Rust et al. | June 3, 1941 |
| 2,270,295 | Harley | Jan. 20, 1942 |
| 2,505,585 | Silent | Apr. 25, 1950 |
| 2,547,251 | Bonadio | Apr. 3, 1951 |
| 2,565,231 | Hepp | Aug. 21, 1951 |
| 2,605,333 | Job | July 29, 1952 |

FOREIGN PATENTS

| | | |
|---|---|---|
| 76,677 | Denmark | Nov. 16, 1953 |

OTHER REFERENCES

Mallory-Yaxley Radio Service Encyclopedia, 1st edition, January 1937, page 117.

Nigro: Journal of the Audio Engineering Society, vol. 1 No. 4 October 1953, pages 287–291.

Notice of Adverse Decision in Interference

In Interference No. 93,445 involving Patent No. 3,053,934, R. B. Gray, AMPLIFIER SYSTEM FOR STERO SOUND, final judgment adverse to the patentee was rendered Jan. 11, 1965, as to claims 1 and 3.

[*Official Gazette May 4, 1965.*]